July 15, 1969 J. A. BEEMER 3,456,157

ELECTRONIC ASSEMBLY

Filed June 12, 1967

INVENTOR
JACK A. BEEMER
BY
[signature]
ATTORNEY

United States Patent Office 3,456,157
Patented July 15, 1969

3,456,157

ELECTRONIC ASSEMBLY

Jack A. Beemer, Indianapolis, Ind., assignor to P. R. Mallory & Co., Inc., Indianapolis, Ind., a corporation of Delaware Filed June 12, 1967, Ser. No. 645,303
Int. Cl. H02g *15/08;* H01c *1/02*
U.S. Cl. 317—99 12 Claims

ABSTRACT OF THE DISCLOSURE

A pair of electrically conductive, elongated U-shaped members has spade terminals at each end of the members and predeterminately spaced such that their lengths overlap. Axial lead electronic components are held between the members.

The generally accepted method for joining axial lead components into a multiple structure is to either solder or weld the terminal leads to another circular conductor lead. However, this method has a number of disadvantages. One disadvantage is that many soldered or welded joints are required. The aforementioned joints are normally of cross wire nature which results in minimum electrical contact and mechanical strength area. Furthermore, when the welded or soldered structure is placed into its container, some malformation is normally experienced due to operator handling. An effort to place the malformed sub-assembly into its container often strains the soldered or welded joints and results in intermittent or open circuit conditions. Further, the axial leads are often subjected to sufficient stress such that the internal connections within each component are damaged. Another disadvantage resides in the necessity of individually making each connection between the component and its conductor wire system, which is a time consuming process.

The present invention is concerned with an electronic holding assembly for axial lead components and has as one of its objects the elimination of the disadvantages of the aforementioned prior art.

Another object of the invention is to provide an electrically conductive holding assembly which holds a plurality of axial lead electronic components in adjacent pairs.

Another object of the invention is to provide an electrically conductive predeterminately spaced elongated U-shaped members for holding the components therebetween.

Still another object is to provide spaced elongated U-shaped members having spade terminals for fixedly holding the axial leads of the components.

Yet another object of the invention is to provide encapsulating means for the assembly.

With these and other objects in view, as will be apparent in the following description and appended claims, this invention resides in the novel construction, combination, arrangement and cooperation of elements as hereinafter described and more particularly defined by the appended claims.

Generally speaking the objects of the invention are accomplished by providing holding means for carrying the axial lead components in adjacent pairs with means to electrically connect and fixedly hold the axial leads of the components to the holding means. More particularly, the invention contemplates providing a pair of predeterminately spaced electrically conductive elongated U-shaped members having spade terminals at each end of the members for connecting the axial leads of the components disposed between the members. An external lead extends from one end of each end of the members. The members are spaced such that their length overlaps with a pair of the components being carried between a spade terminal of each member.

Figures 1, 2:
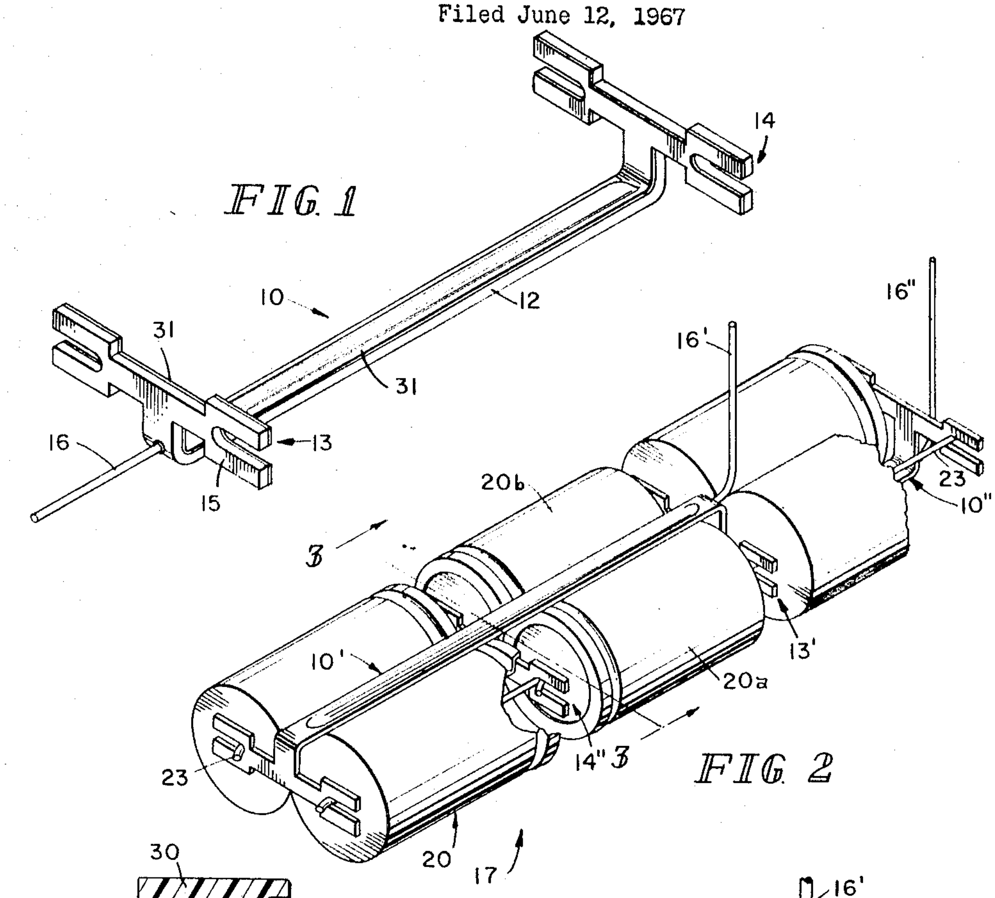
FIGURE 1 is a perspective view of the holding frame which forms part of the holding means of the novel electronic component assembly.
FIGURE 2 is a perspective view of the novel electronic component assembly.

With reference now to FIGURE 1, there is shown an electrically conductive frame 10 which comprises a unitarily constructed, elongated U-shaped member having a base 12. At each end of the base there is shown spade terminals 13 and 14. The spade terminals are substantially axially aligned with the spade portions 15 being directionally opposed. An external terminal 16 extends from one end of the base 12.

Figure 3:
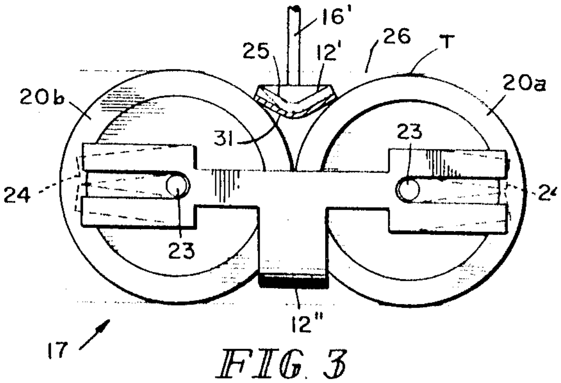
FIGURE 3 is a cross section taken along line 3—3 of FIGURE 2.

With reference to FIGURES 2 and 3, there is shown an electronic component assembly 17 utilizing two of the frames shown in FIGURE 1, namely frames 10′ and 10″. The frames are predeterminately spaced with the members open to each other to hold a plurality of electronic components 20 therebetween. As shown the components are held in adjacent pairs. Frames 10′ and 10″ are overlapped lengthwise such that a pair of the components 20, which may for example consist of capacitors or batteries, are held between spade terminals of each frame. Thus components **20*a* and 20*b* are held between spade terminal 14″ of frame 10″ and spade terminal 13′ of frame 10′. The axial leads 23 of the components 20 are electrically connected and fixedly held to the electrically conductive frames 10′ and 10″ by way of the spade terminals. The term "fixedly held" is here meant to imply that the leads are held as long as desired and that the connection is not permanent. As more clearly shown in FIGURE 3, the spade terminals can be closed as shown by the dotted portion 24 to more effectively mechanically hold the leads 23 in place. If necessary, the leads can also be welded to the terminals. The external leads 16′ and 16″** enable the assembly to be electrically connected to the circuit or apparatus for which the components are being used.

It is noted with particular reference to FIGURE 3, that the base 12′ of the U-shaped member is formed with a V-rib 25 such that the bases 12′ and 12″ can be held beneath the locus of points formed by a line 26 running through the tangent point T formed by the intersection of the outer surface of the component 20 and the radius line of the component normal to the axis of the spade terminals. As will be readily seen, with reference to FIGURE 4, this construction allows for compactness of the assembly such that it can be easily encapsulated. But perhaps more important, this structure permits the assembly to be compact and rigid even though components 20 may not be of the same size. Thus the base 12′ is biased against components 20 such that the spade terminals are biased against the leads 23 of the components such that when the spade terminals are closed, the assembly 17 becomes a rigid, self-contained unit. Furthermore, one of the components can be smaller than the other, and the asembly will still retain its rigidity. Thus if component **20*b* is of a smaller diameter, the assembly will still be rigid since the base 12′ will be biased against component 20*a* which will hold both components with the spades being closed. The bases 12′ and 12″ also include an electrical insulator 31** such as a thermoplastic resin, for example.

Figure 4:
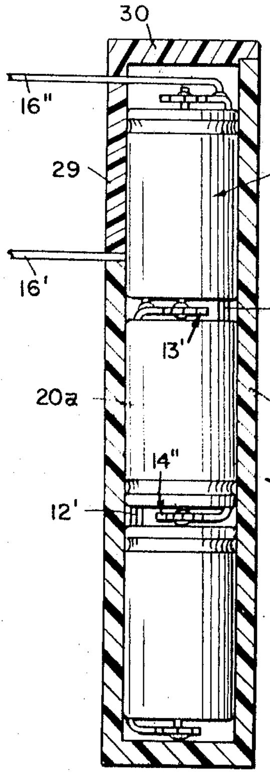
FIGURE 4 is a partial cross section showing the assembly contained in suitable encapsulating means.

With reference to FIGURE 4, the assembly 17 is shown contained in encapsulating means 27. The assembly is first inserted in a lower shell 28. A small side piece 29 is then fitted between external leads 16′ and 16″. Cap 30 is then positioned to complete the encapsulation of the assembly. As shown the encapsulating means is formed of a suitable insulating material such as a thermoplastic resin. Because of the location of the base members 12′ and 12″ of the frames carrying the components, the encapsulating means can be snugly fitted against the components. This also adds rigidity to the whole unit. In addition, it should be noted that because of the construction of the frame itself, insertion into the encapsulating means is simple, with little chance of loss of connection of the various electrical leads.

It should be understood that several assemblies can be held together as a unit to form a bank of components. The assemblies can be connected axially with the frames end to end, or they can be connected adjacent to each other. The combined assemblies can then be encapsulated. Alternatively, several encapsulated assemblies can be connected together to form a single unit with the axial leads 16′ and 16″ being connected together.

Thus there is described a novel electronic assembly in which axial lead electronic components are simply and rigidly held in place. Accordingly, it is contemplated that the scope of the invention is to be determined from the following appended claims.

What is claimed is:

1. An electrically conductive holding frame for holding electronic components comprising a unitarily constructed elongated U-shaped member, at least one spade terminal at each end of said member, and an external electrical terminal extending from one end of said member.

2. An electrically conductive holding frame for holding electronic components comprising a unitarily constructed elongated U-shaped member, a pair of spade terminals at each end of said member, said terminals being axially aligned with their spade portions being directionally opposed, and an external electrical terminal extending from one end of said member.

3. An electrically conductive holding frame for holding electronic components according to claim 2, in which said spade portion of said spade terminals are closed.

4. An electrically conductive holding frame for holding electronic components comprising a unitarily constructed U-shaped member, said member having an elongated base having a V-shape such that said base is disposed below the locus of points determined by a line drawn through the tangent point formed by intersection of the outer surface of at least one of two cylindrical electronic components held in adjacent parallel position by said frame and a radius line of said component normal to the axis of a pair of spade terminals at each end of said member, said terminals being axially aligned with their space portions being directionally opposed, and an external electrical terminal extending from one end of said member.

5. Holding means for a plurality of axial lead electronic components comprising a pair of parallel spaced electrically conductive unitarily constructed elongated U-shaped members, spade terminals at each end of said members, said terminals being axially aligned with their spade portions being directionally opposed, an external electrical lead extended from one end of each of said members, said members being predeterminately spaced to retain said axial lead components therebetween, said leads being extended through and fixedly held by said spade terminals.

6. Holding means according to claim 5, in which said spade portions of said terminals are closed.

7. Holding means for a plurality of axial lead electronic components comprising a pair of parallel spaced electrically conductive unitarily constructed elongated U-shaped members, spade terminals at each end of said members, an external electrical terminal extended from one end of each of said members, said members being predeterminately spaced to retain said components, said axial leads being extended through and fixedly held by said spade terminals, and means for encapsulating said members and said electrical components.

8. An electronic assembly comprising a pair of predeterminately spaced parallel electrically conductive unitarily constructed elongated U-shaped members having a pair of spade terminals at each end of said members, said members being axially aligned and disposed such that said members are open to each other and their lengths overlap each other, a plurality of electronic components having axial leads disposed between said members, said leads being extended through and fixedly held by said spade terminals, and an external electrical terminal extending from one end of each of said members.

9. An electronic assembly comprising a pair of predeterminately spaced parallel electrically conductive unitarily constructed elongated U-shaped members having a pair of spade terminals at each end of said members, said members being axially aligned and disposed such that said members are open to each other and their lengths overlap each other, a plurality of electronic components having axial leads disposed between said members, said leads being extended through and fixedly held by said spade terminals, an external terminal extending from one end of each of said members, and means encapsulating said members and said electronic components.

10. An electronic assembly comprising a pair of predeterminately spaced parallel electrically conductive unitarily constructed elongated U-shaped members having a pair of spade terminals at each end of said members, said members being axially aligned and disposed such that said members are open to each other and their length overlaps each other, a plurality of axial lead electronic components disposed between said members, said components being disposed in adjacent pairs between alternate spade terminals of each of said members, the base of said members being V-shaped such that said bases are disposed below the locus of points determined by a line drawn through the tangent point formed by the intersection of the outer surface of at least one of said components and the radius of such component normal to the axis of said spade terminal, said axial leads being extended through and fixedly held by said spade terminals and an external terminal extending from one end of each of said members.

11. An electronic assembly according to claim 10, including means to encapsulate said members and said components.

12. An electronic assembly according to claim 10, in which insulating means is disposed between said base of said members and said components.

References Cited

UNITED STATES PATENTS

| | | | |
|---|---|---|---|
| 2,007,224 | 7/1935 | Stoekle | 317—99 |
| 3,060,349 | 10/1962 | Brady et al. | 317—99 |

LEWIS H. MYERS, Primary Examiner

G. P. TOLIN, Assistant Examiner

U.S. Cl. X.R.

174—94; 338—320